Figure 1:
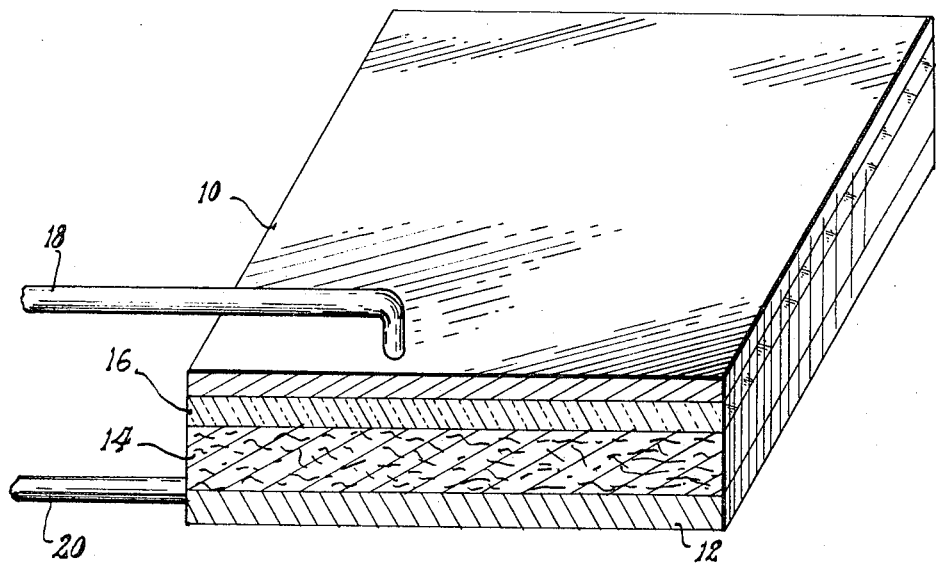

3,437,524
SOLID ELECTROLYTE ALKALI METAL
VOLTAIC CELL
Drannan Hamby, McMinnville, Oreg., assignor to the
United States of America as represented by the Secretary of the Air Force
Filed Oct. 5, 1966, Ser. No. 584,609
Int. Cl. H01m 3/02
U.S. Cl. 136—83                                                5 Claims This invention relates to an electrochemical cell of the voltaic type. More particularly, this invention relates to an improved voltaic cell and to a method for producing electrical power by electrochemically oxidizing the metals sodium and lithium.

The use of alkali metals such as sodium or lithium in energy producing voltaic cells is well known. Heretofore, this was accomplished by decreasing the activity of the alkali metal through an alloying technique; or by utilizing porous separators between the alkali metal anode and the electrolyte. These prior art methods. however, suffered certain disadvantages which seriously affected the efficient operation of the cell. For example, decreasing the activity of the alkali metal lowered the cell terminal potential difference. Also, the direct reaction of the alkali metal anode with either the electrolyte or the cathode and the resultant dissolution of the alkali metal in the electrolyte and transport to the cathode resulted in a decrease in reactant utilization and attendant lowering of overall cell efficiency.

In accordance with this invention, however, it has been found that the above-noted deficiencies of the prior art can be abrogated by utilizing an improved voltaic cell in which a non-porous, selectively conductive membrane is used to separate the alkali metal containing anode from the electrolyte. The membrane is selectively conductive to alkali metal ions of the same type as found in the alkali metal containing anode. It functions to prevent the dissolution of the alkali metal into the electrolyte and the direct reaction of the alkali metal with components of the electrolyte or the cathode such as gaseous reactants. The voltaic cell of this invention, in general, is composed of four components; namely, an alkali metal alloy anode, an electrolyte, solid at room temperature but liquid at normal operating temperature, a cathode and an alkali metal ion conductive non-porous membrane. Various ceramic compositions and fabrication procedures have been found useful in producing a membrane material suitable for use in this invention and specific examples of ceramic and glass compositions will be described hereinafter in greater detail as illustrative of the invention. The invention, however, is not limited to the particular compositions or fabrication procedures described since the essential characteristics of the membrane are that it be non-porous, selectively conductive to the proper alkali metal ion and mechanically and chemically stable under conditions of cell operations.

Accordingly, it is the primary object of this invention to provide a new and improved voltaic cell.

Another object of this invention is to provide a voltaic cell that utilizes an alkali metal as an anodic material.

Still another object of this invention is to provide a voltaic cell that is particularly adapted to prevent the dissolution of its anodic material into its electrolyte.

A further object of this invention is to provide an alkali metal containing voltaic cell that possesses an improved efficiency due to a high degree of reactant utilization.

Still further objects and advantages of this invention will become apparent upon consideration of the following detailed description thereof taken in conjunction with the accompanying drawings, in which:

FIGURE 1 is a perspective view, partly in section, of a voltaic cell embodying the invention; and FIGURES 2 through 5 are graphical presentations of various characteristics of the voltaic cells of this invention.

This invention involves, in its simplest form as shown in FIGURE 1, a flat voltaic cell comprising an anode 10, a cathode 12, an electrolyte 14, and a non-porous separating membrane 16. Leads 18 and 20 provide electrical connection from the cell to an external circuit. Other configurations, such as the use of a tubular structure in which the anode, cathode, electrolyte and membrane material are concentrically arranged within a sealed envelope may also be employed as the energy delivering cell. The anode may comprise a tin based alkali metal alloy such as a sodium-tin alloy or lithium tin alloy and can be prepared in situ by electrolysis. Various salts, such as $CaCl_2$, $NiCl_2$, $NaCl$, $KCl$ and $LiCl$, all of which are reagent grade, may be employed as the anhydrous electrolyte. The salts, which are in powder form, are vacuum oven dried and stored in screw-cap bottles until ready for use. If $NiCl_2$ is employed it usually requires a further drying treatment in which HCl is passed over the oven dried powder for several hours at 400° C. Final dehydration of each melt is carried out after mixing the oven dried salts by chlorinating the molten salt in the presence of carbon for at least one hour. The cathode may be constructed of nickel or chlorine. In the case of chlorine electrodes they are made from porous carbon while the nickel is utilized in either flat or cylindrical sheets.

The compositions and fabrication procedures for suitable non-porous membrane materials used in the voltaic cell of the invention are presented below in Table I. The materials and their fabrication, however, are merely illustrative since the only essential characteristic is that the membrane material be selectively conductive to the proper alkali metal ion.

TABLE I.—MEMBRANE MATERIALS

| Example Number: | Practical Composition, Weight Percent | Actual Analysis Weight Percent | Fabrication (Procedure) | Firing Temperature |
|---|---|---|---|---|
| 1 | Spodumene, 74.2 <br> Edgar Plastic <br> Kaolin, 7.0 <br> Tenn. No. 1 Ball, 7.0 <br> LiF, 11.8 | $SiO_2$, 57.9 <br> $Al_2O_3$, 30.7 <br> $Li_2O$, 7.7 <br> $Fe_2O_3$, 2.0 <br> F, 4.14 | Wet milled <br> Slip cast | 1,000° C. |
| 2 | Glass $F_1$ Fritted, 69.5 <br> Tenn. No. 1 Ball Clay, 17.1 <br> Georgia Kaolin, 13.4 | $SiO_2$, 50.5 <br> CaO, 0.6 <br> $Al_2O_3$, 41.6 <br> $Na_2O$, 6.6 | Wet milled <br> Slip case | 1,065° C. |
| 3 | Glass $F_1$ | $Na_2SiO_3$, 26.8 <br> $Al_2O_3$, 22.4 <br> $SiO_2$, 24.5 <br> Tenn. No. 1 Ball Clay, 11.3 | Dry milled <br> Fired <br> Pulverized, for frit | 1,250° C. |
| 4 | $LiCO_3$, 38.0 <br> Georgia Kaolin, 62.0 | $Li_2O$, 20.2 <br> SiO, 42.5 <br> $Al_2O$, 35.5 <br> $Fe_2O_3$, 0.3 <br> $TiO_2$, 0.8 <br> $Na_2O$, 0.2 <br> $K_2O$, 0.3 | Sintered <br> Wet milled <br> Spray dried <br> Pressed | 1,100° C. |
| 5 | Spodumene, 80.0 <br> Glass $E_2$ Fritted, 20.0 | | Wet milled, spray dried <br> Pressed | 1,150° C. |
| 6 | Glass $E_2$ | $SiO_2$, 76.1 <br> $Al_2O_3$, 8.1 <br> $Li_2O$, 15.8 | Dry milled <br> Fired <br> Pulverized for frit | 1,200° C. |
| 7 | Penberthy Glass | $SiO_2$, 78.6 <br> $Na_2O$, 19.4 <br> $Al_2O_3$, 0.9 <br> $K_2O$, 0.1 <br> GaO, 0.0 <br> $Fe_2O_3$, 0.1 | Drawn from melt | |

Figure 5:
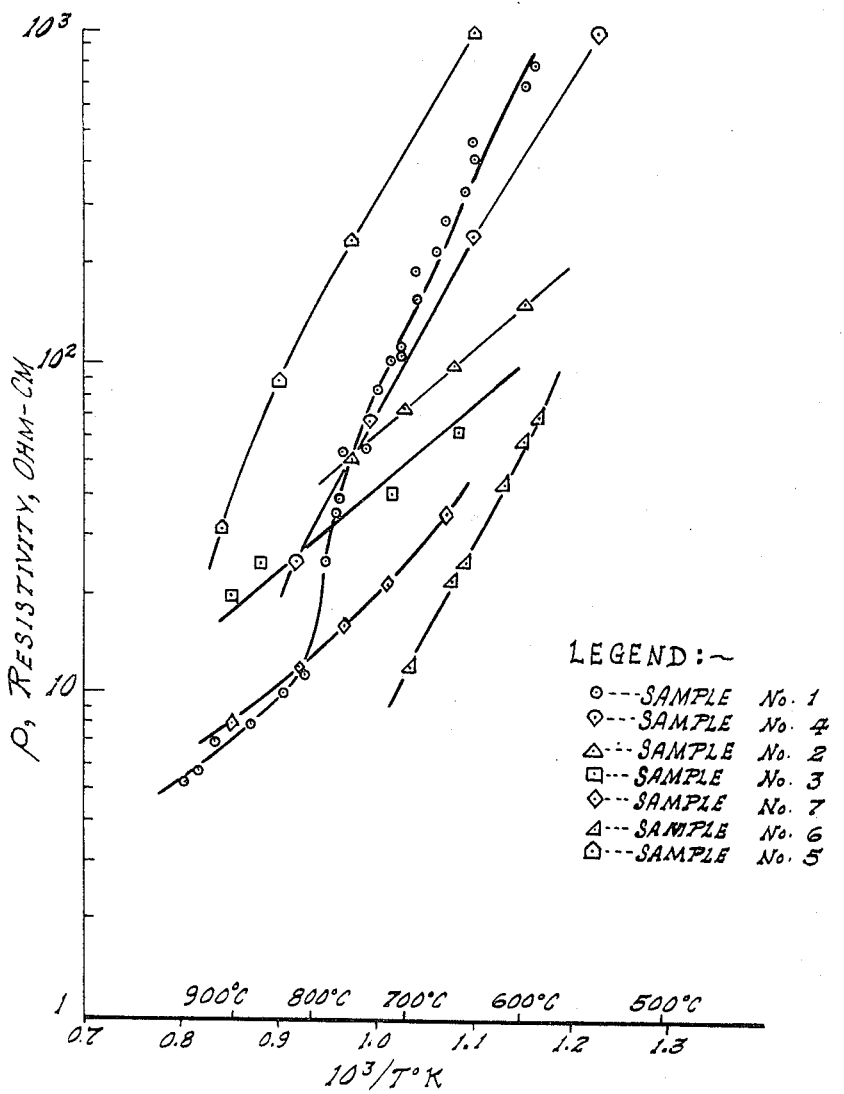

The resistivities of the various membrane materials, listed in Table I are presented in FIGURE 5. Solid cylindrical samples of the membrane material were coated on the ends with graphite and placed between carbon steel electrodes. Chromel-Alumel thermocouples placed in contact with the sample surface were used to control and record the sample temperature. The resistances were measured under an inert atmosphere with an ESI 1000-cycle resistance bridge and plotted as functions of $1/T°$ K.

Specific examples of voltaic cells contemplated within the scope of this invention together with selected cell data are presented in Table II as illustrative embodiments. Both solid (sodium or lithium aluminosilicate ceramics) and semi-solid (glass) membrane materials are represented.

Figure 2:
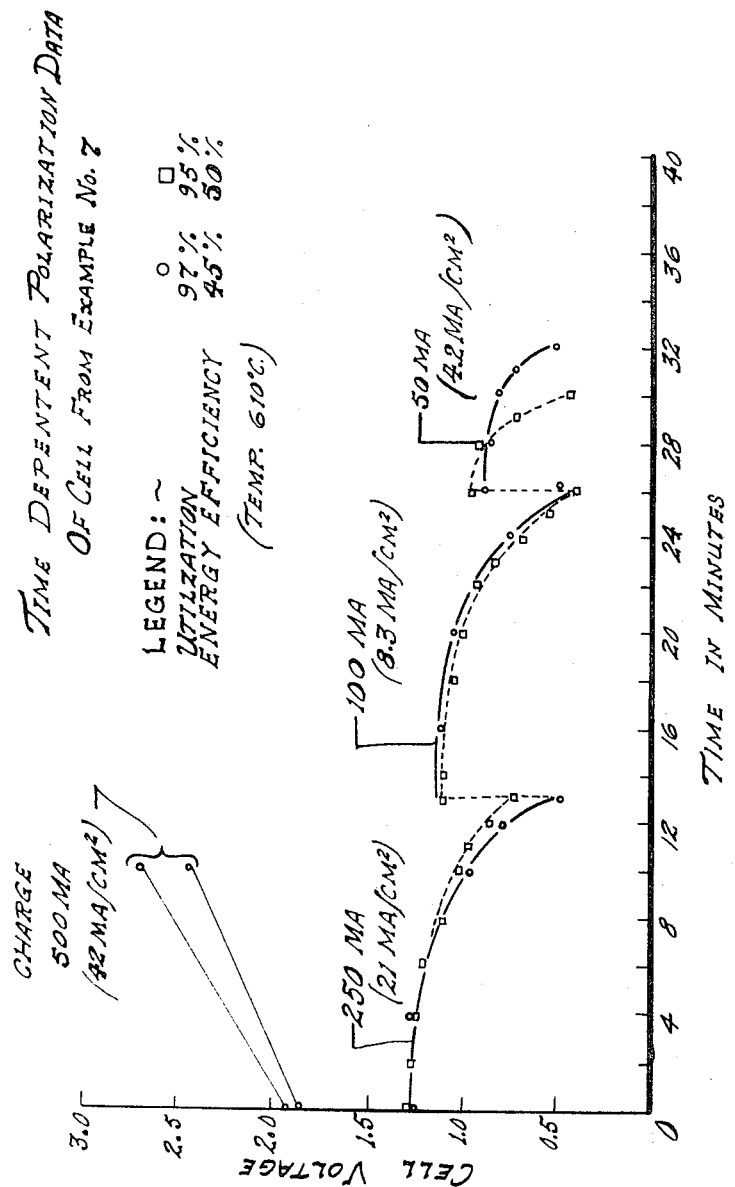
Figure 3:
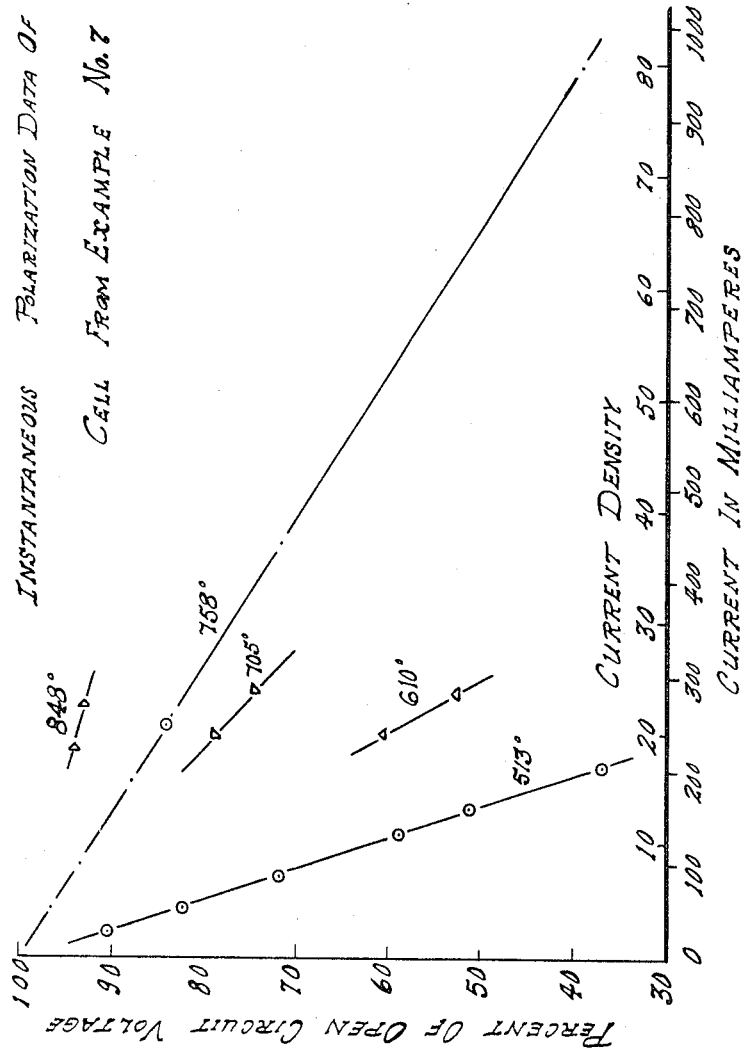
Figure 4:
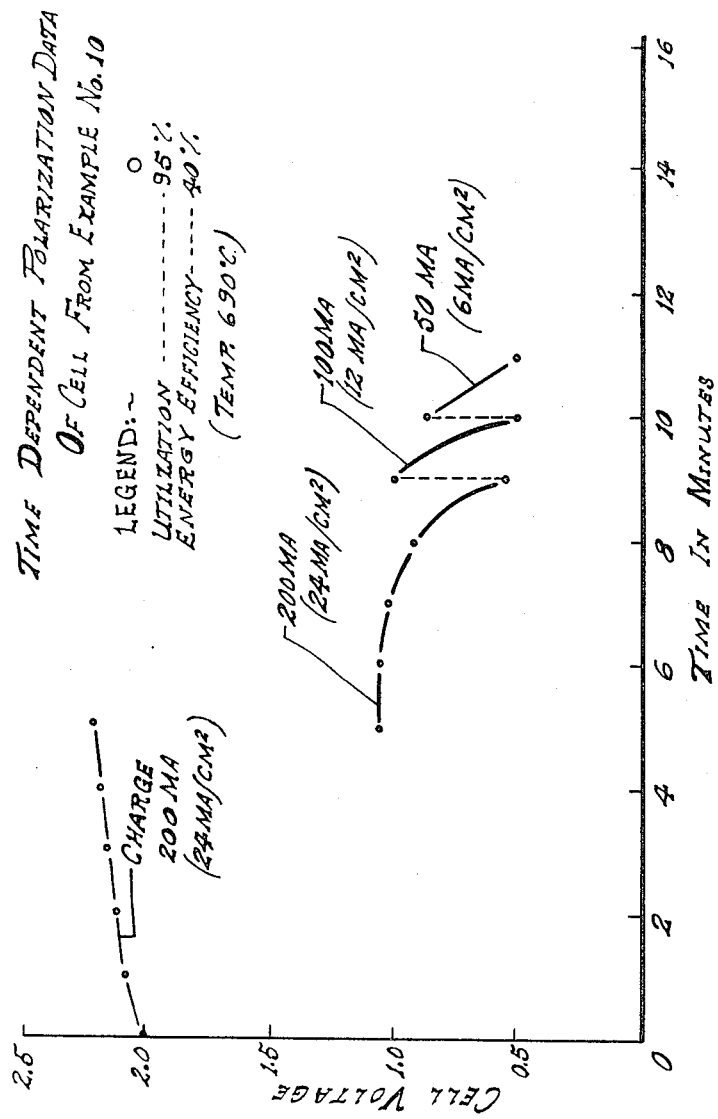

An illustration of cell performance and efficiency for selected examples is shown in FIGURES 2, 3, and 4. The procedure for testing the cells involved cycling a cell through several charge and discharge cycles, each charg-

TABLE II.—CELL DATA

| Example Number | Anode Alloy | Membrane | Electrolyte (Mole percent) | Cathode | Operating Temperature, °C | Open Circuit Voltage | Cell Life |
|---|---|---|---|---|---|---|---|
| 6 | Na(Sn) | Na+ conductive material from Example No. 3 | NaCl, 46; CaCl$_2$, 45; NiCl$_2$, 9 | Ni | 730 | 1.85 v. (1.3 atom percent Na) | 3 hr. |
| 7 | Li(Sn) | Li+ conductive material from Example No. 1 | LiCl, 45; KCl, 45; NiCl$_2$, 10 | Ni | 500–900 | 1.5 v. at 730° C. and 1 atom percent Li | 22 hr. intermittently over 5 day period. |
| 8 | Li(Sn) | Li+ conductive material from Example No. 5 | LiCl, 100 | Cl$_2$, C | 720 | 2.43 v., 1 atom percent Li | 26 hr. |
| 9 | Na(Sn) | Na+ conductive material from Example No. 7 | NaCl, 100 | Cl$_2$, C | 820 | 2.35 v., 1 atom percent Na | 15 hr. |
| 10 | Na(Sn) | Na+ conductive material from Example No. 2 | NaCl, 45; KCl, 45; NiCl$_2$, 10 | Ni | 680 | 1.6 v. at 1 atom percent Na | 11 hr. | ing cycle being carried out at a constant current for a definite period of time. During each discharge cycle the cell current was decreased as the anodic reactant was depleted; however, each discharge cycle was terminated at the same cell current and terminal potential. Thus, after establishing the cycle, data such as that shown in FIGURES 2, 3, and 4 was recorded. The cell characteristics which were measured were (a) open circuit voltage, (b) instantaneous polarization, (c) time dependent polarization, (d) energy efficiency, (e) utilization of anode reactant, and (f) cell life. Energy efficiency and reactant utilization were defined as:

$$\text{Energy Efficiency (percent)} = \frac{\int I_{\text{discharge}} V dt}{\int I_{\text{charge}} V dt} \times 100$$

$$\text{Utilization (percent)} = \frac{\int I_{\text{discharge}} dt}{\int I_{\text{charge}} dt} \times 100$$

With:

$V$ = terminal potential difference
$t$ = time

The maximum continuous anodic current density obtained, 42 ma./cm.$^2$ at a terminal potential difference of 1.1 volt was recorded during the testing of cell from Example 6. The thickness of this membrane was 1 mm. For the purpose of testing, the cell components were enclosed in a two-part, air tight, Vycor and Pyrex glass envelope. An inner Vycor crucible was provided to contain the electrolyte and provision was made for the electrodes, a thermocouple tube and sampling tube to enter the envelope through the Pyrex top. Tubular anode membranes, closed at one end, were also used for cell testing.

It will be seen, therefore, that the present invention provides an improved type of voltaic cell having characteristics which make it especially useful in special purpose batteries or fuel cells. It provides an improved electrical power supply system which operates at a high degree of efficiency with maximum reactant utilization.

While the invention has been described with particularity in reference to specific embodiments thereof, it is to be clearly understood that the disclosure of the present invention is for the purpose of illustration only and it is not intended to limit the invention since the scope thereof is defined by the appended claims.

What is claimed is:

1. In an electrochemical cell comprising an alkali metal alloy containing anode, a cathode and an anhydrous electrolyte the improvement in combination therewith which comprise positioning a non-porous, ion-conductive membrane between said anode and said electrolyte.

2. An electrochemical cell as defined in claim 1 wherein said anode contains sodium ions and said membrane is selectively conductive to said sodium ions.

3. An electrochemical cell as defined in claim 1 wherein said anode contains lithium ions and said membrane is selectively conductive to said lithium ions.

4. An electrochemical cell as defined in claim 2 wherein said membrane is sodium aluminosilicate.

5. An electrochemical cell as defined in claim 3 wherein said membrane is lithium aluminosilicate.

References Cited

UNITED STATES PATENTS

| | | | |
|---|---|---|---|
| 3,160,531 | 12/1964 | Spindler | 136—83 |
| 3,219,556 | 11/1965 | Arthur et al. | 204—195 XR |
| 3,245,836 | 4/1966 | Agruss | 136—83 |
| 3,313,720 | 4/1967 | Robinson | 204—195 |

WINSTON A. DOUGLAS, *Primary Examiner.*

A. SKAPARS, *Assistant Examiner.*

U.S. Cl. X.R.

136—146; 204—295